United States Patent
Vidyadhara et al.

(10) Patent No.: US 10,726,133 B1
(45) Date of Patent: Jul. 28, 2020

(54) SECURELY LOADING UEFI IMAGES AT RUNTIME

(71) Applicant: Dell Products L.P., Round Rock, TX (US)

(72) Inventors: Sumanth Vidyadhara, Bangalore (IN); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 16/267,277

(22) Filed: Feb. 4, 2019

(51) Int. Cl.
  *G06F 9/44* (2018.01)
  *G06F 21/57* (2013.01)
  *G06F 9/4401* (2018.01)
  *G06F 16/901* (2019.01)

(52) U.S. Cl.
  CPC .......... *G06F 21/575* (2013.01); *G06F 9/4411* (2013.01); *G06F 16/901* (2019.01); *G06F 21/572* (2013.01)

(58) Field of Classification Search
  CPC .... G06F 9/44502; G06F 9/44508; G06F 1/24; G06F 9/44526; G06F 15/177; G06F 9/44514; G06F 9/44523; G06F 11/1417; G06F 9/44505
  See application file for complete search history.

(56) References Cited

U.S. PATENT DOCUMENTS

| | | | |
|---|---|---|---|
| 8,656,146 B2* | 2/2014 | Findeisen | G06F 21/72 713/2 |
| 9,578,008 B2* | 2/2017 | Sood | H04L 63/205 |
| 9,672,112 B2* | 6/2017 | Roche | G06F 3/0679 |
| 10,185,828 B2* | 1/2019 | Vidyadhara | G06F 21/575 |
| 10,482,257 B2* | 11/2019 | Suryanarayana | G06F 21/575 |
| 10,521,216 B2* | 12/2019 | Yu | G06F 9/4405 |
| 2006/0174055 A1* | 8/2006 | Flynn | G06F 9/4406 711/100 |
| 2014/0215196 A1* | 7/2014 | Berlin | G06F 21/572 713/2 |
| 2014/0281577 A1* | 9/2014 | Nicholes | G06F 21/85 713/189 |
| 2016/0210457 A1* | 7/2016 | Cleeton | G06F 21/60 |
| 2016/0275291 A1* | 9/2016 | Campbell | G06F 21/575 |
| 2016/0306978 A1* | 10/2016 | Thadikaran | G06F 12/1466 |
| 2018/0181411 A1* | 6/2018 | Rothman | G06F 1/3234 |
| 2018/0349607 A1* | 12/2018 | Khatri | G06F 21/575 |
| 2019/0042754 A1* | 2/2019 | Jreij | H04L 9/083 |
| 2019/0163497 A1* | 5/2019 | Samuel | G06F 13/4282 |

* cited by examiner

*Primary Examiner* — Zahid Choudhury
(74) *Attorney, Agent, or Firm* — Kirton McConkie; Brian Tucker

(57) ABSTRACT

UEFI images can be securely loaded at runtime so that it is unnecessary to flash the entire platform firmware whenever a UEFI image is added or updated. The platform firmware can include an OEM file list that maps file GUIDs to public keys. When it is desired to add a UEFI image, the OEM can employ one of the file GUIDs in the OEM file list and a private key corresponding to the mapped public key to create the UEFI image. During the PEI phase of the boot process, a verification module in the platform firmware can verify any added UEFI image using the OEM file list. Additionally, to ensure that the added UEFI images will pass the subsequent Secure Boot verification, a sync module can add custom Secure Boot keys for the added UEFI images to the Secure Boot databases during the DXE phase of the boot process.

20 Claims, 8 Drawing Sheets

| OEM File List 200 | |
|---|---|
| File GUID | Public Key |
| 4319CBBA-0980-4245... | PublicKey1 |
| 961578FE-B6B7-44C3... | PublicKey2 |
| 9E863906-A40F-4875... | PublicKey1 |
| FC5C7020-1A48-4198... | PublicKey3 |
| ... | |

401
Install Platform Firmware On A Computing Device, The Platform Firmware Including A Secure Boot Database, A Verification Module And A File List That Defines Mappings Between File Globally Unique Identifiers (GUIDs) And Public Keys, The Mappings Including A First Mapping Between A First File GUID And A First Public Key

402
After The Platform Firmware Has Been Installed On The Computing Device, Create A First UEFI Image By Assigning The First File GUID To The First UEFI Image And Including A First Signature Of The First UEFI Image That Is Generated Using A First Private Key That Corresponds To The First Public Key

403
Store The First UEFI Image With The First Signature On The Computing Device

404
During A Subsequent Boot Process, Identify, By The Verification Module, That The First UEFI Image Has Been Stored On The Computing Device

405
Employ, By The Verification Module, The First Public Key To Verify The First Signature

406
In Response To The Verification Module Verifying The First Signature, Add The First Signature To The Secure Boot Database To Thereby Cause The First UEFI Module To Be Verified During Secure Boot Verification

*FIG. 4*

SECURELY LOADING UEFI IMAGES AT RUNTIME

CROSS-REFERENCE TO RELATED APPLICATIONS

N/A

BACKGROUND

The Unified Extensible Firmware Interface (UEFI) specification defines a boot process that is divided into three general phases: (1) a security phase (SEC); (2) a pre-EFI initialization phase (PEI); and (3) a driver execution environment phase (DXE). SEC performs minimal processing to initialize the CPU and prepare the system for PEI including verifying the platform firmware. PEI then configures the entire platform and loads the DXE. Finally, DXE loads drivers, mounts drives and executes the OS bootloader to eventually transfer control to the OS.

FIG. 1A provides a generalized overview of the components that are involved in the UEFI integrity verification process when a computing device 100 boots. As shown, computing device 100 includes a CPU 101, flash memory 102 which stores platform firmware 105 and storage 103 (e.g., a hard disk or Serial Peripheral Interface (SPI) flash that includes a UEFI firmware volume) that stores UEFI images 110-112.

When computing device 100 is powered on and as part of SEC, CPU 101 verifies that the platform firmware 105 stored in flash 102 has been digitally signed by the original equipment manufacturer (OEM) (e.g., by verifying the Authenticated Code Module (ACM), the Bootguard Key Manifest, the Initial Boot Block (IBB), etc.). As represented by the arrow in FIG. 1A, this verification employs a hash of the OEM's public key that is typically flashed into fuses on the CPU which ensures that only the OEM can modify the platform firmware (i.e., because the platform firmware must be signed using the OEM's private key, it is not possible for others to modify or replace the platform firmware).

Once platform firmware 105 has been verified, and as part of PEI, platform firmware 105 (e.g., a PEI driver) initiates "Secure Boot" to ensure that only trusted UEFI images, such as DXE modules and the OS bootloader, are loaded. With Secure Boot, platform firmware 105 verifies that each UEFI image 110-112 has been properly signed. As represented by the arrows in FIG. 1A, this verification is performed using Secure Boot keys stored in Secure Boot databases that form part of platform firmware 105. The OEM is responsible for creating and storing the Secure Boot keys. A detailed explanation of the verification of UEFI images can be found in section 31.5 of the UEFI Specification, Version 2.7 Errata A.

Each Secure Boot database is in the form of an EFI SIGNATURE LIST structure which includes a number of EFI SIGNATURE DATA structures. Each EFI SIGNATURE DATA structure defines a signature and a GUID representing the owner of the signature (e.g., the provider of the UEFI image). These Secure Boot databases include an authorized database and a forbidden database. Prior to loading a UEFI image, platform firmware 105 will first compare the UEFI image's signature to the signatures in the authorized and forbidden databases. If the UEFI image's signature is included in the authorized database and not included in the forbidden database, the platform firmware will load the UEFI image. For example, as shown in FIG. 1A, the authorized database includes signatures 110a, 111a and 112a among possibly many others. Therefore, any UEFI image that has a valid signature matching any of these signatures in the authorized database will be allowed to load.

Accordingly, if the OEM desires to add a DXE module (e.g., a UEFI wireless driver), it is necessary to update platform firmware 105 by including the DXE module's signature in the authorized database. In other words, a Secure Boot key corresponding to the added DXE module must be added to the Secure Boot databases. Since this modification to the Secure Boot databases is a modification to platform firmware 105, it will be necessary to sign the modified platform firmware using the OEM's private key and then write the modified and signed platform firmware to flash 102. This requirement to flash the entire platform firmware whenever a Secure Boot key is added to the Secure Boot databases is cumbersome. However, if the platform firmware is not updated to include the Secure Boot key corresponding to an added DXE module, the DXE module will fail the PEI verification process and will not be loaded (i.e., the authorized database will not include the signature of the added DXE module).

FIG. 1B illustrates this requirement to flash the entire platform firmware 105 whenever a Secure Boot key is added to the Secure Boot databases. As shown, a new UEFI image 113 has been added to storage 103. UEFI image 113 would need to be signed using the provider's private key and then the appropriate Secure Boot key including signature 113a would need to be added to the Secure Boot databases that form part of platform firmware 105 on flash 102. The same would be true if any existing UEFI image is updated.

The Secure Boot key for the new UEFI image 113 cannot simply be added to the existing platform firmware 105 because the addition would cause the existing signature to no longer be valid. Therefore, in addition to adding the Secure Boot key to the Secure Boot databases, the OEM will need to sign the updated platform firmware 105a and then write the updated platform firmware 105a to flash 102. This will ensure that CPU 101 will verify the updated platform firmware 105a using the OEM public key.

BRIEF SUMMARY

The present invention extends to methods, systems, and computer program products for securely loading UEFI images at runtime so that it is unnecessary to flash the entire platform firmware whenever a UEFI image is added or updated. The platform firmware can include an OEM file list that maps file GUIDs to public keys. When it is desired to add a new or updated UEFI image, the OEM can employ one of the file GUIDs in the OEM file list and a private key corresponding to the mapped public key to create the UEFI image and add it to the computing device. During the PEI phase of the boot process, a verification module in the platform firmware can verify any added UEFI image using the OEM file list. To ensure that the added UEFI images will pass the subsequent Secure Boot verification, a sync module can add custom Secure Boot keys for the added UEFI images to the Secure Boot databases during the DXE phase of the boot process.

In one embodiment, the present invention is implemented as a method for securely loading UEFI images at runtime. Initially, platform firmware is installed on a computing device. The platform firmware includes a Secure Boot database, a verification module and a file list that defines mappings between file GUIDs and public keys. These mappings include a first mapping between a first file GUID and a first public key. After the platform firmware has been installed on the computing device, a first UEFI image is created by assigning the first file GUID to the first UEFI image and including a first signature of the first UEFI image that is generated using a first private key that corresponds to the first public key. The first UEFI image with the first signature is then stored on the computing device. During a subsequent boot process, the verification module identifies that the first UEFI image has been stored on the computing device and employs the first public key to verify the first signature. In response to the verification module verifying the first signature, the first signature is added to the Secure Boot database to thereby cause the first UEFI module to be verified during Secure Boot verification.

In another embodiment, the present invention is implemented as a method for securely loading UEFI images at runtime. During a boot process, a verification module that is part of platform firmware on a computing device accesses a file list that is also part of the platform firmware. The file list defines mappings between file GUIDs and public keys. The verification module also accesses one or more firmware volumes stored on the computing device to determine whether any UEFI images in the one or more firmware volumes have a file GUID matching a file GUID defined in the file list. Upon determining that a first UEFI image stored in one of the one or more firmware volumes has a first file GUID that is defined in the file list, the verification module employs a first public key to which the first file GUID is mapped to verify a first signature that is stored with the first UEFI image. In response to the verification module verifying the first signature, a DXE module adds the first signature to a Secure Boot database that is part of the platform firmware.

In another embodiment, the present invention is implemented as computing device that includes: a CPU that stores an OEM public key; flash memory on which platform firmware is stored, the platform firmware being signed with an OEM private key corresponding to the OEM public key, the platform firmware including Secure Boot databases, a verification module and a file list that defines mappings between file GUIDs and public keys; and storage on which one or more firmware volumes are stored, the one or more firmware volumes including a first set of UEFI images each of which has a signature that is stored in the Secure Boot databases of the signed platform firmware and a second set of UEFI images each of which has a signature that is not stored in the Secure Boot databases of the signed platform firmware. The verification module is configured to verify the UEFI images in the second set by determining, for each UEFI image in the second set, whether the UEFI image has a file GUID that is defined in the file list and if so whether the UEFI image was signed using a private key that corresponds to the public key to which the file GUID is mapped.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 2A illustrates an example of an OEM file list that can be included as part of the platform firmware to enable the techniques of the present invention to be implemented;

FIG. 4 provides a flowchart of an example method for securely loading UEFI images at runtime.

DETAILED DESCRIPTION

In this specification and the claims, the term platform firmware should be construed as the firmware on a computing device that includes the UEFI Secure Boot databases. The term UEFI image should be construed in accordance with its definition in the UEFI specification and therefore includes UEFI applications, UEFI OS loaders and UEFI drivers. The term DXE module should be construed as a type of UEFI image that is executed during the DXE phase.

Figure 2:
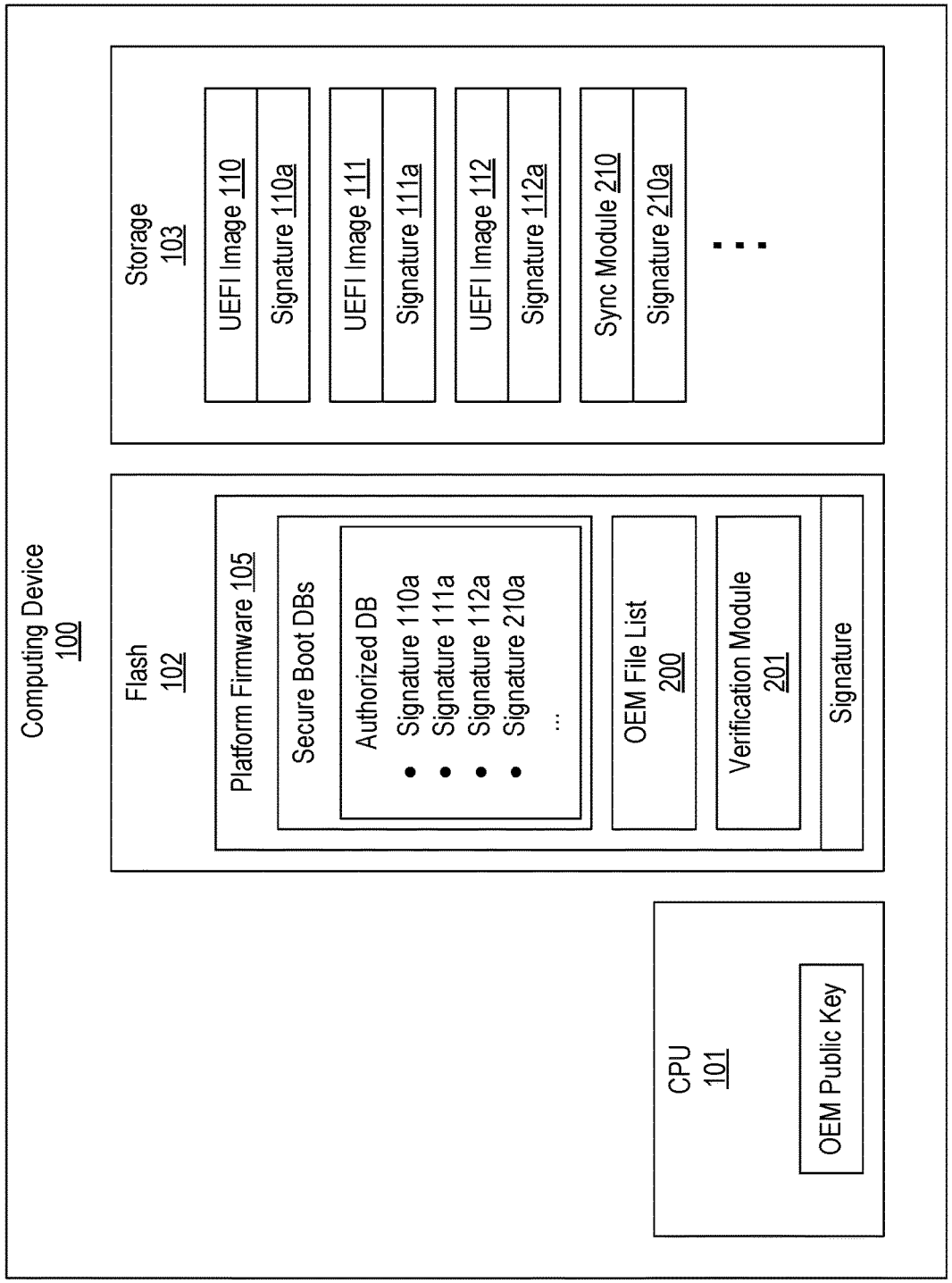
FIG. 2 illustrates components that can be employed to enable a UEFI image to be added or updated without requiring the entire platform firmware to be reflashed.

In accordance with embodiments of the present invention, a DXE module (or another type of UEFI module) can be added or updated on a computing device without requiring the platform firmware to be reflashed while also ensuring that the DXE module will be successfully verified as part of the Secure Boot process. FIG. 2 illustrates components that can be employed to accomplish this.

Figure 1A:
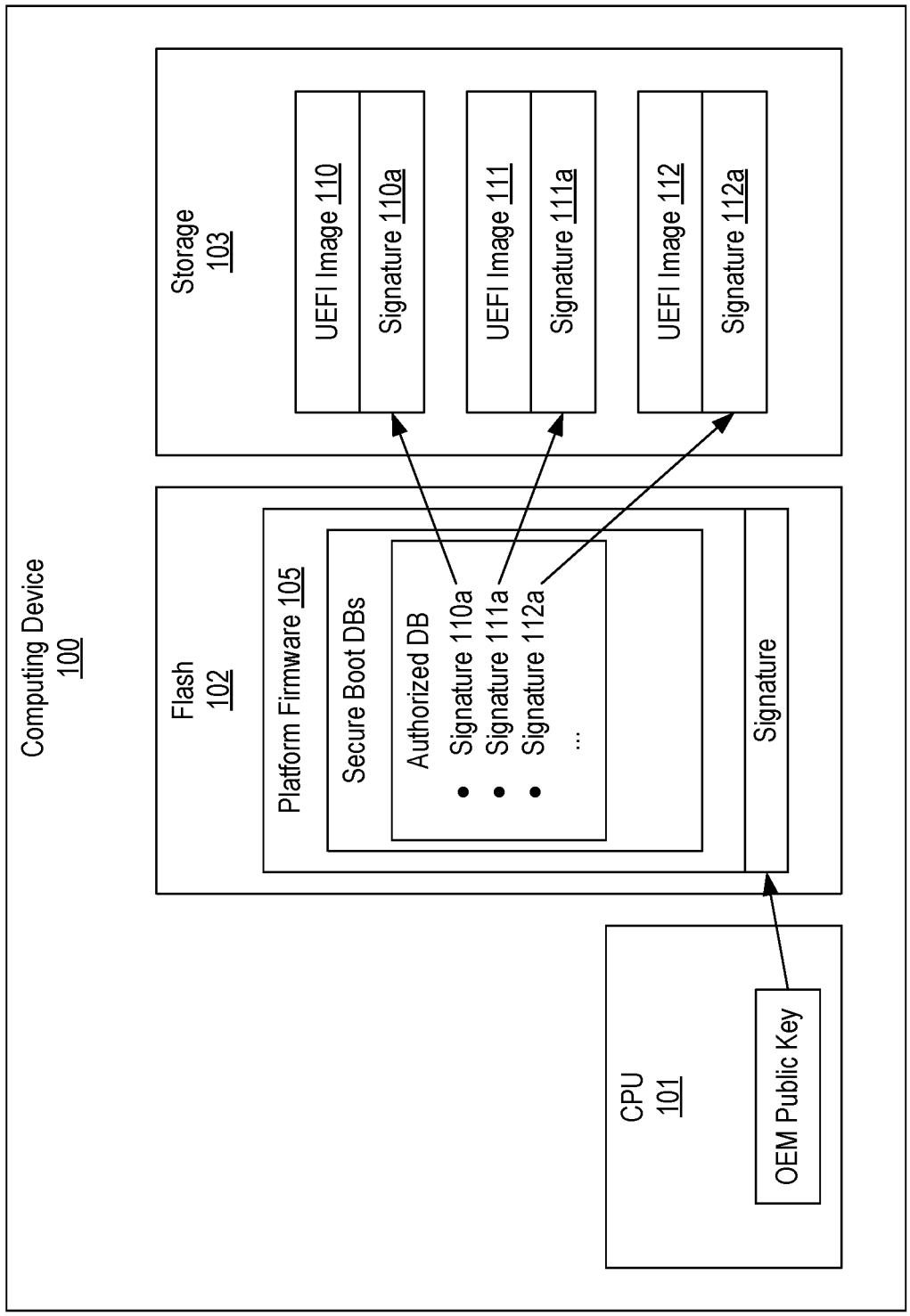
FIG. 1A provides an overview of the UEFI integrity verification process that is performed when a computing device boots.
Figure 1B:
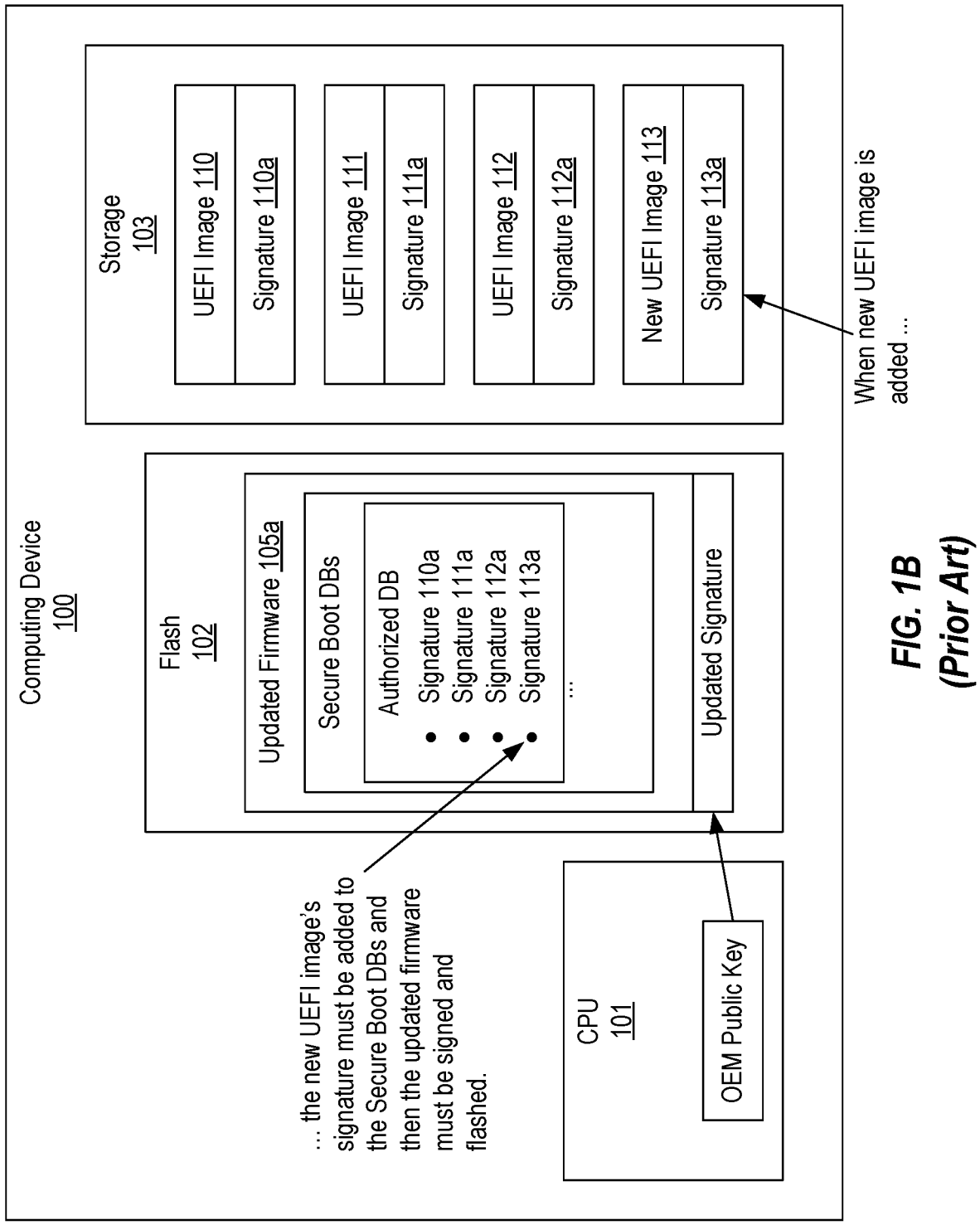
FIG. 1B illustrates why it is necessary to reflash the entire platform firmware when a UEFI image is added or updated on a computing device.

Similar to what is shown in FIG. 1A, when the present invention is implemented, computing device 100 will include CPU 101 that stores the OEM's public key, flash 102 that stores platform firmware 105 and storage 103 that includes a number of UEFI images. Storage 103 can represent any storage medium on which a UEFI firmware volume is stored including a reserved partition of a hard disk or SPI flash. As described in the background, platform firmware includes the Secure Boot databases and is signed using the OEM's private key.

In contrast to what is shown in FIG. 1A, in FIG. 2, platform firmware 105 also includes an OEM file list 200 and verification module 201. Storage 103 also includes a sync module 210 which is a type of UEFI image. OEM file list 200 and verification module 201 can be part of the original platform firmware that the OEM installs on computing device 100. As shown, the authorized database in platform firmware 105 can include the signature 210a of sync module 210 so that sync module 210 will be verified in a typical manner during Secure Boot. Accordingly, FIG. 2 can represent the state of computing device 100 before any DXE module is added or updated using the techniques of the present invention.

FIG. 2A illustrates a simplified example of the contents of OEM file list 200 that the OEM can include in the original platform firmware. As shown, OEM file list 200 includes mappings of file GUIDs to public keys. As is known, each UEFI image has a GUID. When the OEM creates OEM file list 200, the file GUIDs included in OEM file list 200 do not yet define any particular UEFI image. As will be described in detail below, the OEM defines these file GUIDs so that they can subsequently be used for a new or updated DXE module that is added to computing device 100 after platform firmware 105 has been installed. The public key to which each file GUID is mapped corresponds to a private key that the OEM (or other provider of the DXE module) can use to sign the DXE module.

Because OEM file list 200 is included in platform firmware 105, OEM file list 200 will be verified as part of Boot Guard verification as described in the background. In other words, the signature on platform firmware 105 encompasses OEM file list 200. Therefore, as long as CPU 101 verifies the platform firmware 105's signature using the OEM's public key, it will be known that the contents of platform firmware 105, including the Secure Boot databases, OEM file list 200 and verification module 201, have not been altered.

Figure 3A:
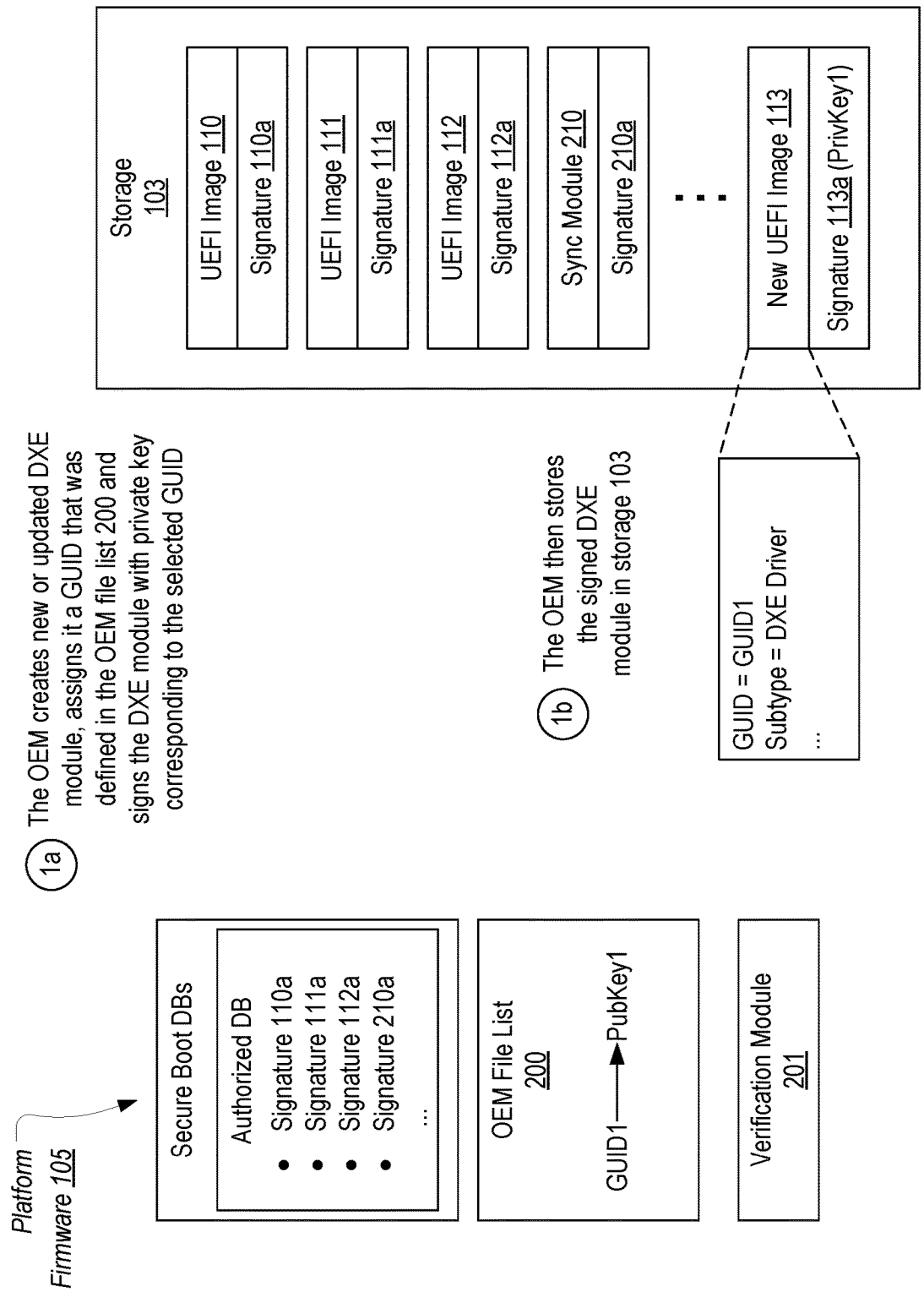
FIGS. 3A-3C illustrate the process by which the present invention enables a UEFI image to be added and verified at runtime without requiring the entire platform firmware to be reflashed.
Figure 3B:
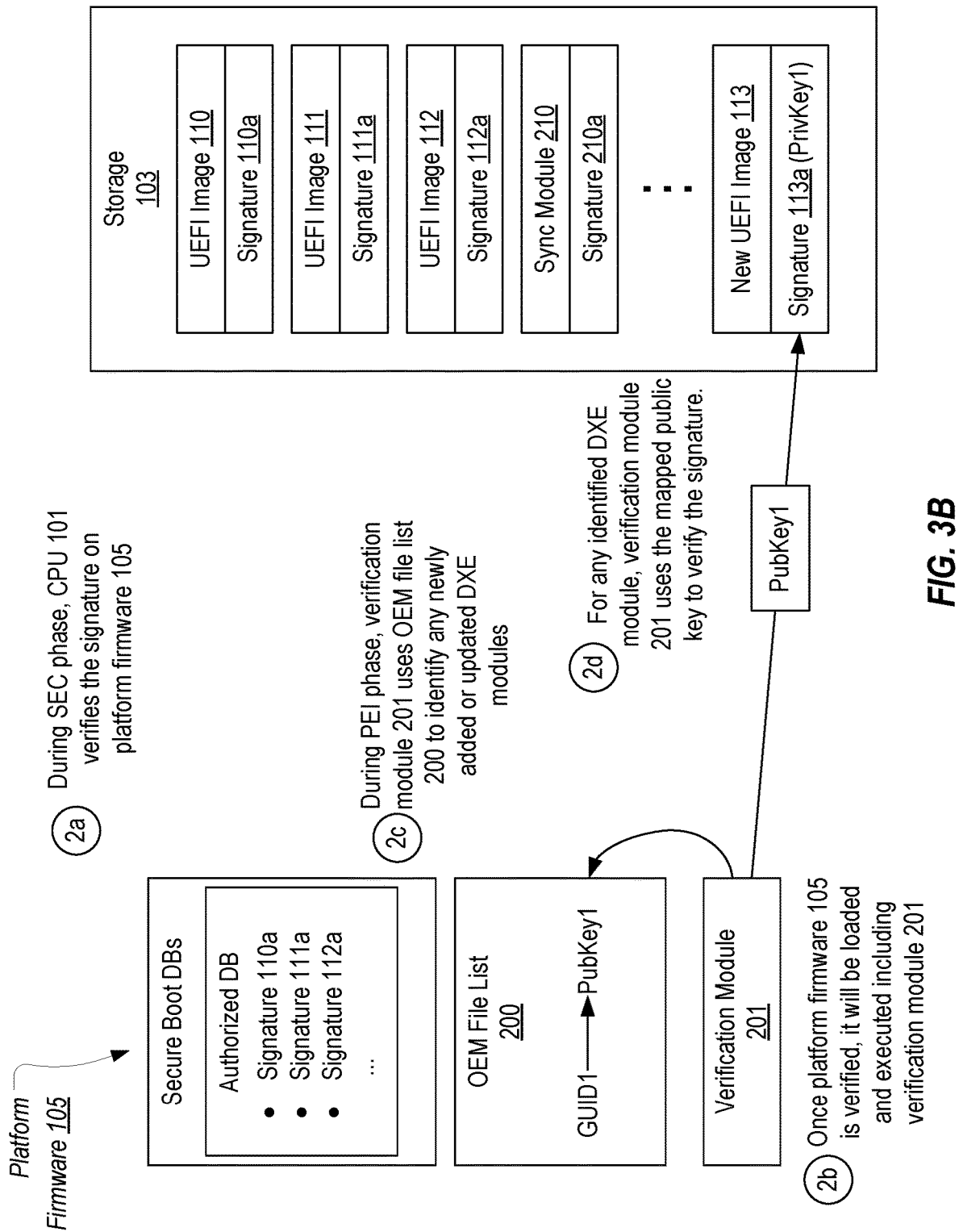
Figure 3C:
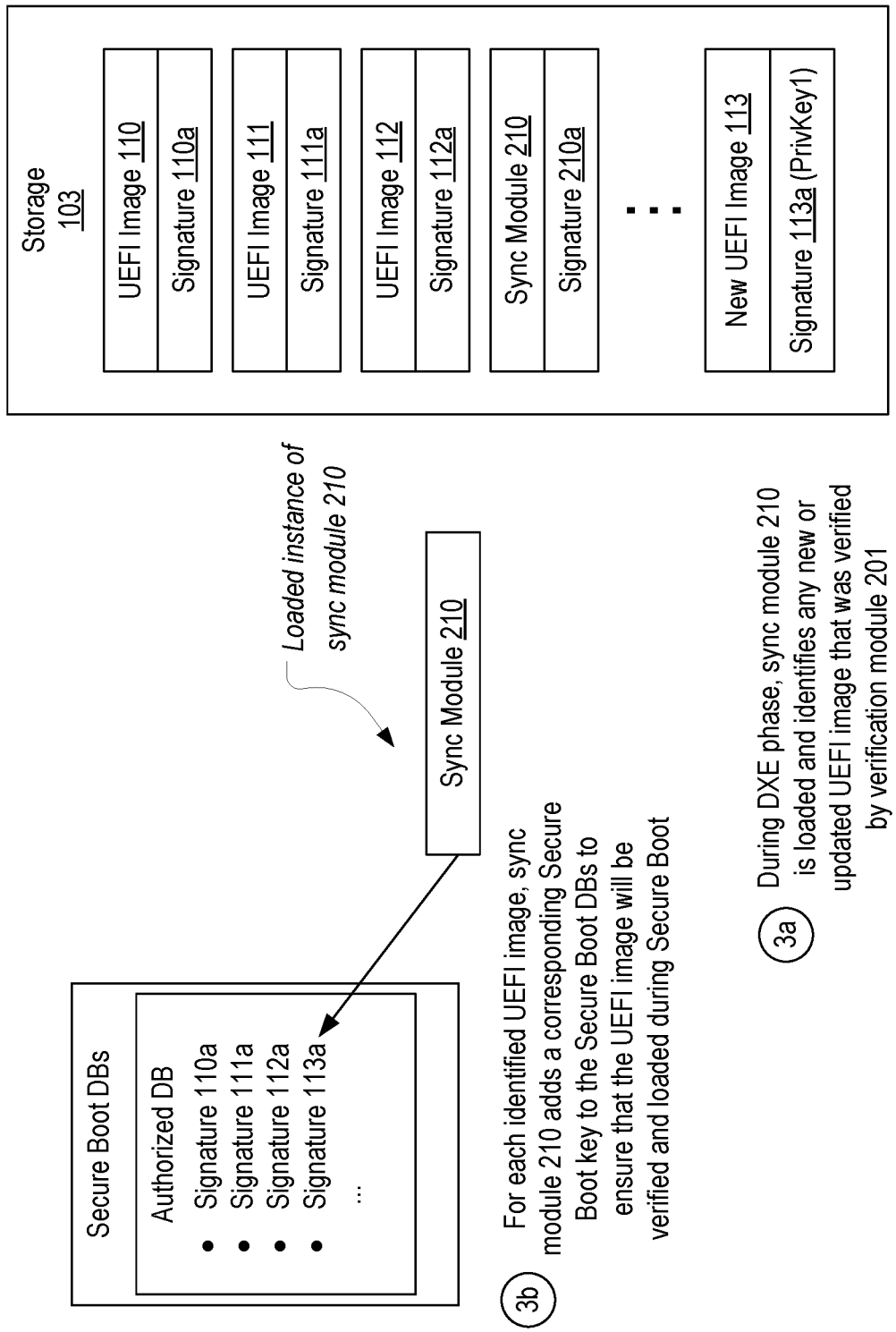

FIGS. 3A-3C illustrate how OEM file list 200, verification module 201 and sync module 210 are employed to ensure that a newly added DXE module is verified during the Secure Boot verification process without adding the DXE module's signature to the Secure Boot databases in platform firmware 105. In other words, these figures represent how the present invention enables new or updated DXE modules to be added to computing device 100 without reflashing platform firmware 105.

In FIG. 3A, and to simplify the illustration, OEM file list 200 is shown as including a single file GUID (GUID1) to public key (PubKey1) mapping. However, in typical implementations, OEM file list 200 would include many such mappings so that many DXE modules could be added to computing device 100 without reflashing platform firmware 105.

Because the OEM created OEM file list 200, it will be aware of the file GUID to public key mappings that are defined therein. Accordingly, as represented by step 1a, when the OEM desires to create and add UEFI image 113 to computing device 100, it can assign it one of the file GUIDs that are included in OEM file list 200 and sign it using the private key corresponding to the public key to which the selected file GUID is mapped. Therefore, in this example, the OEM has assigned UEFI image 113 the file GUID of GUID1 and signed it using PrivKey1. Then, as represented in step 1b, the OEM can store UEFI image 113 in storage 103.

Prior to continuing with the description of the present invention, it is noted that, using prior art techniques, UEFI image 113 would not pass Secure Boot verification and would therefore not be loaded because signature 113a does not appear in the authorized database. As described in the background, using prior art techniques, the OEM would have to update the platform firmware so that signature 113a is included in the authorized database and then reflash the platform firmware. The present invention eliminates this requirement while still enabling UEFI image 113 to be verified during Secure Boot.

Turning to FIG. 3B, after UEFI image 113 has been added to computing device 100 and during a subsequent boot, CPU 101 will employ the OEM's public key to verify the signature on platform firmware 105 as is represented in step 2a. This verification of platform firmware 105 is carried out in the manner described in the background. However, of importance to the present invention, this verification encompasses verifying that the contents of OEM file list 200 have not been altered. In step 2b, once CPU 101 has verified platform firmware 105, it will load and execute the platform firmware.

As represented in step 2c, during the PEI phase, verification module 201 will be executed. Verification module 201 can be configured to employ OEM file list 200 to identify any new or updated DXE modules that may have been added to storage 103. For example, verification module 201 can read the file GUIDs defined in OEM file list 200 and search each firmware volume on storage 103 to determine if any UEFI images having any of these file GUIDs exist. In this example, verification module 201 will determine that UEFI image 113 has a file GUID of GUID and is therefore a UEFI image that has been added.

Next, in step 2d, verification module 201 can verify any UEFI image that has a file GUID matching any file GUID contained in OEM file list 200. To perform this verification, verification module 201 can employ the public key to which the file GUID is mapped in OEM file list 200 to verify the signature on the UEFI image. For example, because UEFI image has a file GUID of GUID1, verification module 201 can employ PubKey1 to verify signature 113a. In this way, it can be ensured that only the OEM that has knowledge of the file GUID to public key mappings and that has the private key can add a UEFI module that will be successfully verified by verification module 201.

At this point, although verification module 201 will have verified that any added UEFI image was added by the OEM (or other entity having knowledge of the OEM file list 200 and the private key), the added UEFI image will still fail Secure Boot verification because its signature does not exist in the Secure Boot databases. FIG. 3C illustrates how sync module 210 is employed to address this.

Sync module 210 can be in the form of a DXE module that is configured to be loaded during the DXE phase prior to the loading of any UEFI images that were added in accordance with the techniques of the present invention. For example, sync module 210 can be configured to be loaded by the DXE dispatcher prior to UEFI image 113 or any other added DXE module.

As represented in step 3a in FIG. 3C, during the DXE phase, sync module 210 can identify any UEFI image that was verified by verification module 201. For example, verification module 201 can be configured to record (e.g., in a UEFI variable) the file GUID of any UEFI module that it verified in step 2d so that sync module 210 can subsequently identify these file GUIDs. In step 3b, for each identified UEFI image, sync module 210 can add the UEFI image's signature to the authorized Secure Boot database. For example, in FIG. 3C, sync module 210 is shown as adding signature 113a to the authorized database. Sync module 210 can add signatures to the authorized database in accordance with the techniques described in section 31.5.3 of the UEFI Specification, Version 2.7 Errata A (e.g., by employing the GetVariable( ) and SetVariable( ) functions).

Because sync module 210 updates the authorized Secure Boot database to include the signature of any added and verified UEFI image (or more specifically, to include a Secure Boot key corresponding to the added and verified UEFI image), the UEFI image will be verified as part of the Secure Boot process. In particular, and as described in the background, prior to the UEFI image being loaded, the Secure Boot databases will be searched to determine whether the UEFI image's signature is included in the authorized database and not included in the forbidden database. Because sync module 210 will have added the signature prior to the UEFI image being loaded, the Secure Boot verification will succeed thereby enabling the UEFI image to be loaded.

To summarize, the OEM can include an OEM file list in the platform firmware. This OEM file list can define mappings between file GUIDs and public keys that the OEM can subsequently use to create a UEFI image. Because the OEM file list is included in the platform firmware, it will be verified as part of the Boot Guard verification process thereby ensuring that the OEM file list cannot be tampered with. As part of the PEI phase, a verification module that forms part of the platform firmware can identify and verify any added UEFI image using the corresponding public key defined in the OEM file list. A sync module that is loaded during the DXE phase can then update the Secure Boot databases to include an appropriate Secure Boot key for any added UEFI image so that the added UEFI image will be verified during the Secure Boot process. This process can be performed during each boot to ensure that any added UEFI modules will be identified and verified. As a result of this process, the platform firmware does not need to be updated when a UEFI image is added to the computing device.

FIG. 4 provides a flowchart of an example method 400 for securely loading UEFI images at runtime. Method 400 can be implemented on computing device 100.

Method 400 includes an act 401 of installing platform firmware on a computing device, the platform firmware including a Secure Boot database, a verification module and a file list that defines mappings between file GUIDs and public keys, the mappings including a first mapping between a first file GUID and a first public key. For example, platform firmware 105 that includes Secure Boot databases, OEM file list 200 and verification module 201 can be stored in flash 102 of computing device 100.

Method 400 includes an act 402 of, after the platform firmware has been installed on the computing device, creating a first UEFI image by assigning the first file GUID to the first UEFI image and including a first signature of the first UEFI image that is generated using a first private key that corresponds to the first public key. For example, UEFI image 113 can be created, assigned GUID1 and signed using PrivKey1.

Method 400 includes an act 403 of storing the first UEFI image with the first signature on the computing device. For example, UEFI image 113 can be stored in storage 103.

Method 400 includes an act 404 of, during a subsequent boot process, identifying, by the verification module, that the first UEFI image has been stored on the computing device. For example, during the PEI phase of the boot process, verification module 201 can employ OEM file list 200 to determine that UEFI image 113 has been added to computing device 100.

Method 400 includes an act 405 of employing, by the verification module, the first public key to verify the first signature. For example, because UEFI image 113 has a file GUID of GUID1, verification module 201 can employ the mapped public key, PubKey1, to verify signature 113a.

Method 400 includes an act 406 of, in response to the verification module verifying the first signature, adding the first signature to the Secure Boot database to thereby cause the first UEFI module to be verified during Secure Boot verification. For example, during the DXE phase of the boot process, sync module 210 can add signature 113a to the Secure Boot authorized database (e.g., in the form of a custom Secure Boot key) so that UEFI image 113 will be verified during the Secure Boot process.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for securely loading Unified Extensible Firmware Interface (UEFI) images at runtime, the method comprising:
   installing platform firmware on a computing device, the platform firmware including a Secure Boot database, a verification module and a file list that defines mappings between file globally unique identifiers (GUIDs) and public keys, the mappings including a first mapping between a first file GUID and a first public key;
   after the platform firmware has been installed on the computing device, creating a first UEFI image by assigning the first file GUID to the first UEFI image and including a first signature of the first UEFI image that is generated using a first private key that corresponds to the first public key;
   storing the first UEFI image with the first signature on the computing device;

during a subsequent boot process, identifying, by the verification module, that the first UEFI image has been stored on the computing device;

employing, by the verification module, the first public key to verify the first signature; and in response to the verification module verifying the first signature, adding the first signature to the Secure Boot database to thereby cause the first UEFI module to be verified during Secure Boot verification.

2. The method of claim 1, wherein the first UEFI image is a first driver execution environment (DXE) module.

3. The method of claim 2, wherein the first signature is added to the Secure Boot database by a second DXE module that is configured to be executed prior to the first DXE module.

4. The method of claim 1, wherein storing the first UEFI image with the first signature on the computing device comprises storing the first UEFI image in a firmware volume on a reserved partition of a hard disk or in Serial Peripheral Interface (SPI) flash.

5. The method of claim 1, wherein identifying, by the verification module, that the first UEFI image has been stored on the computing device comprises accessing the file list to determine that the first file GUID is defined in the file list and determining that the first UEFI image has been assigned the first file GUID.

6. The method of claim 1, wherein employing, by the verification module, the first public key to verify the first signature includes determining, based on the first mapping, that the first public key should be used to verify the first signature.

7. The method of claim 1, wherein the first UEFI image is a DXE driver.

8. The method of claim 1, wherein the mappings include a second mapping between a second file GUID and a second public key, the method further comprising:

creating a second UEFI image by assigning the second file GUID to the second UEFI image and including a second signature of the second UEFI image that is generated using a second private key that corresponds to the second public key;

storing the second UEFI image with the second signature on the computing device;

during a subsequent boot process, identifying, by the verification module, that the first and second UEFI images have been stored on the computing device;

employing, by the verification module, the first public key to verify the first signature and the second public key to verify the second signature; and in response to the verification module verifying the first and second signatures, adding the first and second signatures to the Secure Boot database to thereby cause the first and second UEFI modules to be verified during Secure Boot verification.

9. The method of claim 1, wherein the verification module employs the first public key to verify the first signature during a pre-EFI initialization (PEI) phase of the boot process and a DXE module that executes during a DXE phase of the boot process adds the first signature to the Secure Boot database.

10. A method for securely loading Unified Extensible Firmware Interface (UEFI) images at runtime, the method comprising:

during a boot process, accessing, by a verification module that is part of platform firmware on a computing device, a file list that is also part of the platform firmware, the file list defining mappings between file globally unique identifiers (GUIDs) and public keys;

accessing, by the verification module, one or more firmware volumes stored on the computing device to determine whether any UEFI images in the one or more firmware volumes have a file GUID matching a file GUID defined in the file list;

upon determining that a first UEFI image stored in one of the one or more firmware volumes has a first file GUID that is defined in the file list, employing, by the verification module, a first public key to which the first file GUID is mapped to verify a first signature that is stored with the first UEFI image; and in response to the verification module verifying the first signature, adding, by a driver execution environment (DXE) module, the first signature to a Secure Boot database that is part of the platform firmware.

11. The method of claim 10, wherein the verification module executes during a pre-EFI initialization (PEI) phase of the boot process and the DXE module executes during a DXE phase of the boot process.

12. The method of claim 10, wherein the one or more firmware volumes are stored in Serial Peripheral Interface (SPI) flash.

13. The method of claim 10, wherein adding the first signature to the Secure Boot database comprises adding a custom Secure Boot key to the Secure Boot database, the custom Secure Boot key corresponding to the first signature.

14. The method of claim 10, wherein the platform firmware that includes the file list is signed using an original equipment manufacturer (OEM) private key and verified using a corresponding public key stored in a central processing unit of the computing device.

15. The method of claim 10, further comprising:

upon determining that a second UEFI image stored in one of the one or more firmware volumes has a second file GUID that is defined in the file list, employing, by the verification module, a second public key to which the second file GUID is mapped to verify a second signature that is stored with the second UEFI image; and in response to the verification module verifying the second signature, adding, by the DXE module, the second signature to the Secure Boot database.

16. The method of claim 10, wherein the first UEFI image is a DXE driver.

17. A computing device comprising:

a central processing unit (CPU) that stores an original equipment manufacturer (OEM) public key;

flash memory on which platform firmware is stored, the platform firmware being signed with an OEM private key corresponding to the OEM public key, the platform firmware including Secure Boot databases, a verification module and a file list that defines mappings between file globally unique identifiers (GUIDs) and public keys; and storage on which one or more firmware volumes are stored, the one or more firmware volumes including a first set of UEFI images each of which has a signature that is stored in the Secure Boot databases of the signed platform firmware and a second set of UEFI images each of which has a signature that is not stored in the Secure Boot databases of the signed platform firmware;

wherein the verification module is configured to verify the UEFI images in the second set by determining, for each UEFI image in the second set, whether the UEFI image has a file GUID that is defined in the file list and if so whether the UEFI image was signed using a private key that corresponds to the public key to which the file GUID is mapped.

18. The computing device of claim 17, wherein the first set of UEFI images includes a sync module in the form of a DXE module that is configured to add, to the Secure Boot databases, a signature of each UEFI image in the second set that was verified by the verification module.

19. The computing device of claim 18, wherein the verification module verifies the UEFI images in the second set during a pre-EFI initialization (PEI) phase of a boot process and the sync module adds the signature of each UEFI image in the second set that was verified by the verification module during a DXE phase of the boot process.

20. The computing device of claim 17, wherein the storage comprises one or both of a reserved partition of a hard disk or Serial Peripheral Interface (SPI) flash.

* * * * *